United States Patent
Wang et al.

(10) Patent No.: US 9,258,431 B2
(45) Date of Patent: Feb. 9, 2016

(54) METHODS, SYSTEMS, AND COMPUTER PROGRAM PRODUCTS FOR PROVIDING A DYNAMIC AND FLEXIBLE MEDIA GATEWAY TERMINATION IDENTIFIER

(75) Inventors: Shaobo Peter Wang, Allen, TX (US); Michael Tsao, Plano, TX (US)

(73) Assignee: GENBAND US LLC, Plano, TX (US)

( * ) Notice: Subject to any disclaimer, the term of this patent is extended or adjusted under 35 U.S.C. 154(b) by 1931 days.

(21) Appl. No.: 11/965,892

(22) Filed: Dec. 28, 2007

(65) Prior Publication Data

US 2008/0165947 A1  Jul. 10, 2008

Related U.S. Application Data (60) Provisional application No. 60/877,438, filed on Dec. 28, 2006.

(51) Int. Cl.
*H04M 7/00* (2006.01)
*H04M 7/12* (2006.01)

(52) U.S. Cl.
CPC ................................. *H04M 7/1255* (2013.01)

(58) Field of Classification Search
CPC .................................................. H04M 7/1255
See application file for complete search history.

(56) References Cited

U.S. PATENT DOCUMENTS

| | | | |
|---|---|---|---|
| 6,766,377 | B1 | 7/2004 | Grabelsky et al. |
| 2003/0231639 | A1 | 12/2003 | Mikkola |
| 2004/0208132 | A1* | 10/2004 | Neulist et al. .................. 370/252 |
| 2004/0240456 | A1* | 12/2004 | Picha ............................. 370/401 |
| 2006/0268845 | A1* | 11/2006 | He et al. ........................ 370/352 |

OTHER PUBLICATIONS

Notification of Transmittal of the International Search Report and the Written Opinion of the International Searching Authority, or the Declaration for International Application No. PCT/US07/26443 (Apr. 16, 2008).

Notification Concerning Transmittal of International Preliminary Report on Patentability for International Application No. PCT/US07/26443 (Jul. 9, 2009).

Crocker, "Augmented BNF for Syntax Specifications: ABNF," Network Working Group, RFC 4234 (Oct. 2005).

* cited by examiner

*Primary Examiner* — Luat Phung
(74) *Attorney, Agent, or Firm* — Jenkins, Wilson, Taylor & Hunt, P.A.

(57) ABSTRACT

Methods, systems, and computer program products for providing a dynamic and flexible media gateway termination identifier are disclosed. According to one aspect, the subject matter described herein includes a method for flexibly identifying terminations within a media gateway. The method includes receiving a syntax for representing terminations of a media gateway, communicating the syntax to a network node for processing media gateway control messages, and, at the network node, processing a media gateway control message using the syntax to identify a termination of the media gateway.

22 Claims, 3 Drawing Sheets

METHODS, SYSTEMS, AND COMPUTER PROGRAM PRODUCTS FOR PROVIDING A DYNAMIC AND FLEXIBLE MEDIA GATEWAY TERMINATION IDENTIFIER

PRIORITY CLAIM

This application claims the benefit of U.S. Provisional Patent Application Ser. No. 60/877,438, filed Dec. 28, 2006; the disclosure of which is incorporated herein by reference in its entirety.

TECHNICAL FIELD

The subject matter described herein relates to methods and systems for referencing terminations at a media gateway. More particularly, the subject matter described herein relates to methods, systems, and computer program products for providing a dynamic and flexible media gateway termination identifier.

BACKGROUND

One major telecommunication network evolution in recent history was the physical and functional separation of a media gateway from a media gateway controller. Typically, the media gateway (MGW) provides physical resources and services related to the bearer path of a call, while the media gateway controller (MGC) handles signaling and control functions. One MGC may control multiple MGWs. The physical and functional separation of MGW from MGC allows for the evolution of MGW or MGC technologies with minimal impact on the other. This independence of MGW and MGC from each other is made possible in part by the use of standard protocols that are used by an MGC to control one or more MGWs. The standard protocols used between an MGC and MGWs include H.248/Megaco, media gateway control protocol (MGCP), simple gateway control protocol (SGCP) and other variants, generically referred to as GCPs, or gateway control protocols. GCP messages may include commands sent from the MGC to the MGW, responses sent from the MGW to the MGC, and other messages from an MGC to an MGW and vice versa. For example, the MGW may acknowledge requests from the MGC by providing event notifications to MGC.

Another main function of MGWs is to mediate or perform conversion between different media types. For this reason, an MGW normally is equipped to accommodate the media streams of more than one network technology. For example, an MGW may be used to provide an interface between a public switched telephone network (PSTN) and a packet-based network and to convert data from one format and protocol into another. PSTN networks may use time division multiplexing (TDM), in which the caller's voice is digitized and assigned to a time slot in a frame of data traveling between nodes in the PSTN network, while packet networks may use transmission control protocol (TCP) or user-datagram protocol (UDP) in conjunction with Internet protocol (IP) to transport packets of data such as digitized voice. An MGW, for example, may accommodate TDM, IP, asynchronous transfer mode (ATM) and wireless variants of the media streams. Thus, a MGW may contain a wide variety of media adapters, and each type of adapter may provide specific physical and logical resources.

Two basic constructs in a GCP are terminations and contexts. A context represents a call in a MGW, and a termination is a logical entity that is mapped to a physical resource on a MGW that sources and/or sinks media and/or control streams. One context may contain one or more terminations. Each termination may have a unique identity, referred to as a Termination ID, or TID, assigned by the MGW at the time of its creation. Two types of terminations are physical and ephemeral terminations. Typically, physical terminations, such as TDM channels, exist for as long as they are provisioned in a MGW, while ephemeral terminations, which represent ephemeral information flows, such as RTP flows, would usually exist only for the duration of their use. The physical terminations in voice calls are mapped to physical channels, such as DS0s, which are contained in a physical network trunk such as DS1/E1, DS3/E3, or OC3/STM-1, etc. Those trunks are physically connected to other network nodes. A call agent (CA) at a MGC or a softswitch knows the topologies (how the physical trunks are connected to the network) and routing (what the phones are connected to) through network provisioning of the MGW's physical termination resources into its resource database, so that the call manager/MGC can manage the physical terminations during runtime as a master. An MGW, as a slave, creates or adds a connection using one of the terminations specified by the CA/MGC, and, if requested by the CA/MGC, reports any media events associated with the termination.

The MGC is the resource manager for the physical termination in the associated MGWs, and as a result, one of the key issues for a MGC to control a MGW is how to reference the physical resources within the MGW. In other words, the way a MGC references a resource at a MGW must be understood by the MGW in order for the MGW to understand how to carry out a MGC command. The MGC and the MGW it controls must be able to unambiguously communicate with each other regarding a particular resource, such as a termination, within the MGW.

One difficulty with identifying a TID between an MGW and an MGC lies in the fact that the gateway control protocol (GCP) standards define the termination ID format very loosely. One reason that the TID format is loosely defined in a GCP standard is that the structure of physical resources of one MGW may be quite different from that of another MGW, and thus the TID formats are different as well. Thus, although GCP protocols are open standards, the loosely defined termination ID format hinders providing "Plug-and-Play" capability, because each MGW or MGC vendor may implement their own TID format. Since format of a physical termination ID can vary greatly, even among different media gateways within the same network or controlled by the same MGC, parsing termination ID and specifying a group of resources using wildcarding can be a major challenge for a MGC. This tends to be especially true in a hybrid network, where a MGC may control multiple MGWs from different vendors and a MGW may be also associated with multiple MGCs from different vendors. Thus, even if a GCP-standard-compliant MGW or MGC is added to network, significant integration is required to overcome the interoperability issue, because the MGC must understand this syntax of the additional MGW and be able to use it to specify a single termination resource or to specify a group of resources via a wildcard syntax.

Thus, there is a need for methods, systems, and computer program products for providing a dynamic and flexible media gateway termination identifier.

SUMMARY

According to one aspect, the subject matter described herein includes a method for flexibly identifying terminations within a media gateway. The method includes receiving a syntax for representing terminations of a media gateway, communicating the syntax to a network node for processing media gateway control messages, and, at the network node, processing a media gateway control message using the syntax to identify a termination of the media gateway.

According to another aspect, the subject matter described herein includes a system for flexibly identifying terminations within a media gateway. The system includes a media gateway for providing physical resources related to a bearer path of a call and a media gateway controller for determining, controlling, and configuring the terminations within the media gateway via media gateway control messages communicated between the media gateway controller and the media gateway. At least one of the media gateway and the media gateway controller is configured to receive a syntax for representing the terminations of the media gateway and to process media gateway control messages using the syntax.

The subject matter described herein for providing a dynamic and flexible media gateway termination identifier may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, methods, systems, and computer program products are provided for providing a dynamic and flexible media gateway termination identifier. In one embodiment, a syntax for representing physical resources of a media gateway is defined by a user or operator. The syntax is downloaded or otherwise conveyed to a media gateway and/or a media gateway controller, which uses the syntax to process gateway control protocol (GCP) messages. For example, a media gateway controller could use the syntax to create GCP messages, such as commands or queries, which are then sent to a media gateway. Alternatively, a media gateway could use the syntax to interpret GCP messages received from the media gateway controller to identify a media gateway resource that is the intended subject of the command or query. The same principle could apply to messages generated by the media gateway and sent to the media gateway controller.

Figure 1:
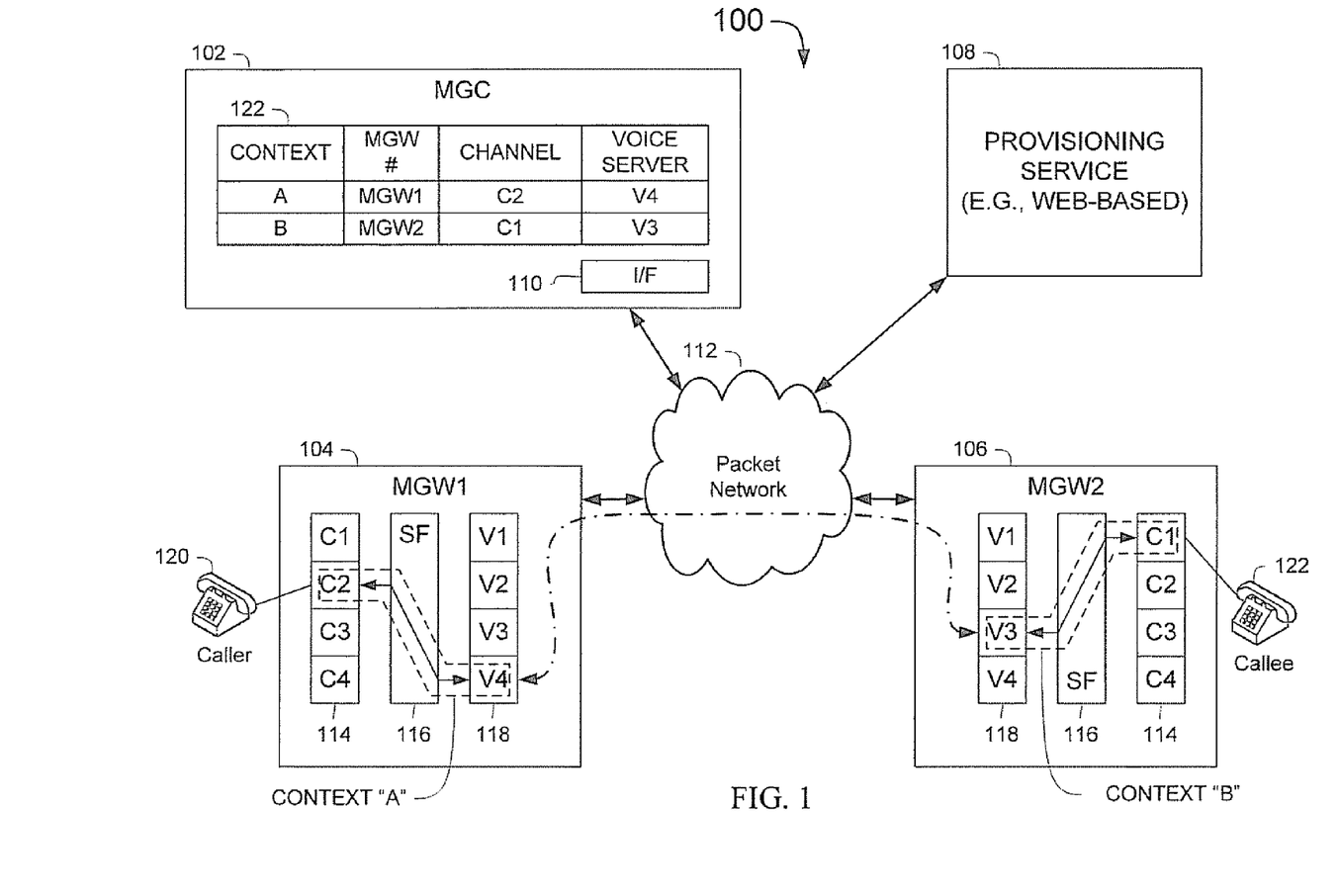
FIG. 1 is a block diagram illustrating an exemplary system for providing a dynamic and flexible media gateway resource identifier in accordance with an embodiment of the subject matter described herein.

FIG. 1 is a block diagram illustrating an exemplary system for providing a dynamic and flexible media gateway termination identifier in accordance with an embodiment of the subject matter described herein. A system 100 includes a media gateway controller MGC 102, which may control one or more media gateways, such as MGW1 104 and MGW2 106, and a provisioning entity PE 108 via which a user or network operator may define a termination identifier syntax and download or otherwise convey the defined syntax to the media gateway controller MGC 102 and/or one or more of the media gateways MGW1 104 and MGW2 106. MGC 102 may be combined with, include, or replace a softswitch and may perform the functions of a softswitch. MGC 102 includes an interface module 110 for interfacing with media gateways and for processing GCP messages. In one embodiment, it is this module that receives a new TID specification and builds control messages using the new TID specification, if MGC 102 is a target node for the new TID definition/format. Media gateways MGW1 104 and MGW2 106 provide physical network resources for communications. If a media gateway is a target node for the new TID format, it may have an interface module responsible for parsing a GCP message according to the new TID format, and processing the message using a new TID format specification.

In one embodiment, the media gateways provide an interface between a public switched telephone network (PSTN) network (not shown) and a packet network 112. Each media gateway may include resources to convert call data between a format used by the PSTN, such as time division multiplexing (TDM), and a format used by packet network 112, such as transmission control protocol over Internet protocol (TCP/IP).

In FIG. 1, both MGW1 104 and MGW2 106 may include a bank of TDM channel interfaces CI 114 for processing a physical data channel, such as a DS0, physical network trunk, such as a DS1/E1, DS3/E3, OC3/STM-1, etc. Each channel in CI 114 may be connected through a switching function SF 116 to one of multiple voice servers VS 118. Conversion between a circuit-based format, such as TDM, and a packet based format, such as TCP/IP, tends to be computationally intensive, and therefore each voice server in VS 118 is typically a higher performance computing device, such as a digital signal processor (DSP). The output of VS 118 may be routed through another switching fabric to an available Ethernet card or other network interface to packet network 112. For clarity, neither the second switching fabric nor the network interfaces are shown in FIG. 1.

As used herein, the term "termination" refers to a logic entity that is mapped to a physical resource on a media gateway that sources and/or sinks media and/or control streams, and a "termination identifier" (TID) is a name used to uniquely identify a termination. For example, in the embodiment illustrated in FIG. 1, MGW1 104 includes eight physical entities that source or sink data, the four channel interfaces in CI 114, identified as C1 through C4, and the four voice servers in VS 118, identified as V1 through V4. From the perspective of MGC 102, each of these physical entities or resources must have a unique TID so that MGC 102 can unambiguously assign or determine these resources as needed to set up a data path through the MGWs. In one embodiment, each resource's TID may be the same as the resource's name, e.g., the TID for C1 is "C1", the TID for V4 is "V4", etc. In this example, the TID includes some suggestion about what type of resource is being referenced. A TID of the form "V<number>" indicates that the resource is a voice server, while a TID of the form "C<number>" indicates that the resource is a TDM channel.

Alternatively, a TID may represent a physical or logical hierarchy within the gateway node, or may include information relating to the structure or hierarchy of the media gateway itself. For example, some gateway nodes are physically comprised of a number of cards populating a card frame, where the frame backbone provides a shared communications bus to each card slot, and each card slot can accept any type of card, such as a TDM channel interface card, a voice server card, etc. In some embodiments, each card may have multiple ports, and in some embodiments the port may handle data streams that are time division multiplexed, in which case the TID may also need to specify a timeslot within the TDM frame. For example, a TID may be a hierarchical description such as "Card number/Port number/Timeslot number". Such TIDs may have the following format: "C7/P3/T15", which means "the $15^{th}$ timeslot on the 3rd port of the card in the $7^{th}$ slot."

In another alternative, a media gateway may simply number its resources sequentially. For example, a media gateway which has only 10 TDM cards, each with 8 ports, each port processing a TDM stream with 25 timeslots, the TID may simply be a number between 1 and 2,000 (10×8×25=2000).

The role of MGC 102 is to assign the hardware resources needed for each call passing through the media gateways under its control. Each call may be allocated an available channel from its bank of channels CI 114 and an available voice server from its bank of voice servers VS 118. As used herein, the term "call leg" refers to the path of a call through a media gateway, and the term "context" refers to the association of a CI 114 with a VS 118 working together to create a call leg. For example, in FIG. 1, a call from caller 120 to callee 122 is made up of two call legs: a call leg through MGW1 104 via TDM channel interface C2 and voice server V4 within MGW1 104, and a call leg through MGW2 106 via voice server V3 and TDM channel interface C1 within MGW2 106. The association of C2 with V4 in MGW1 104 is one context, and the association of C1 with V3 in MGW2 106 is another context.

In one embodiment, MGC 102 may maintain a context table 124 for recording and maintaining information about contexts. Column names are listed in the top row of context table 124, and each data row represents a context/call leg. Moving from left to right along the columns, the first column identifies a context. In this embodiment, the context is given a name consisting of a single letter, such as A, B, C, and so on, at the time that the context is created. The second column identifies the media gateway whose resources are assigned to that context. The third column identifies the TDM channel interface assigned to the call leg, and the fourth column identifies the voice server assigned to the call leg. For example, referring to context table 124, context "A" represents the call leg through from caller 120 to packet network 112 through MGW1 104, using MGW1 104 resources TDM channel interface C2, MGW1's switching fabric SF, and voice server V4, while context "B" represents the call leg from packet network 112 to callee 122 through MGW2 106, using MGW2 106 resources voice server V3, MGW2's switching fabric SF and TDM channel interface C1. The column names, table structure, resource names, or other details of context table 124 may be varied without departing from the scope of the subject matter described herein.

As part of the call setup procedure, MGC 102 must communicate with MGW1 104 and MGW2 106. For example, MGC 102 may request an MGW to reserve a specific termination, or it may query the MGW to determine what, if any, terminations of a specific type are available. MGC 102 may also request the MGW to select any termination of a needed type and simply report back to MGC 102 which termination was selected. All of these operations and interactions between media gateway controller MGC 102 and media gateways MGW1 104 and MGW2 106 require terminations that can be uniquely and unambiguously identified.

As described above, there are many different ways that a media gateway can identify its own resources. A media gateway from one vendor may identify its terminations using a different syntax from that used by a media gateway from another vendor. Thus, MGC 102, MGW1 104, and MGW2 106 must agree on the syntax to be used to identify terminations. In other words, a TID syntax must be defined and used by an MGC and an MGW. In one embodiment, an MGC may use one TID syntax to communicate with one MGW, and another TID syntax to communicate with another MGW, so long as the MGC and MGW agree on the TID syntax to be used between them. In one embodiment, MGC 102 may adapt itself to communicate with a media gateway by using that media gateway's particular syntax. Alternatively, one or both of MGW1 104 and MGW2 106 may adapt itself to communicate with MGC 102 by using the media gateway controller's particular syntax. In other words, the subject matter described herein allows an MGC to specify the TID format while the MGWs adapt to the format through the flexible termination ID expression, if the MGC is a source node for TID definition and the MGW is a target node for TID definition. Alternatively, where a MGW is a source node for TID definition and a MGC is a target node for TID definition, the same principles would apply.

In the embodiment illustrated in FIG. 1, the TID syntax is maintained by provisioning entity PE 108. PE 108 may include a user interface, such as graphical user interface or web-based interface. A user or network operator may define a termination identifier syntax and download or otherwise convey the defined syntax to the media gateway controller MGC 102 and/or one or more of the media gateways MGW1 104 and MGW2 106. The web-based provisioning system PE 108 may receive input of TID format grammar and specification and download a TID specification into a target node for the TID definition. In addition, PE 108 may parse the input TID format specification according to the grammar to prevent any syntactic errors. In one embodiment, PE 108 may compile, assemble, interpret, translate, compress, convert, or otherwise process the TID format specification from one form, such as a human-readable form, into another form, such as a binary form, table form, etc., appropriate for use by the target node.

TABLE 1

Example TID Syntaxes

| Ex# | Format | Example |
| --- | --- | --- |
| 1 | [1-14400] | 7897 |
| 2 | TDM[1-14400] | TDM7897 |
| 3 | C[20-29]/[1-1440] | C25/697 |
| 4 | C[20-29]/P[1-60]/[1-24] | C25/P30/1 |
| 5 | TDM/[20-29]/[1-60]/[1-24] | TDM/25/30/1 |
| 6 | TDMs[20-29]clf[1-60]/[1-24] | TDMs25clf30/1 |
| 7 | TDM/[1-64]/[1-30]/[1-60] | TDM/25/30/1@s1.netw.com |

Table 1, above, contains several examples of a TID syntax to be used between a particular MGC and MGW, such as MGC 102 and MGW1 104. These example TID specifications are to help illustrate the syntax and demonstrate the advantages of the flexible TID in accommodating a wide variety of TID formats. For the convenience of illustration, the following is assumed for the examples above: a) the MGW has 10 network interface cards (NICs), numbering from 21~30; b) each NIC card has 60 ports, also known as card-level facilities, or CLFs; and c) each facility/port has 24 channels. Each example will now be described in detail.

EXAMPLE 1

[1-14400] 7897

In this example, the input format [1-14400] means that the TID is a simply a number within the range of 1 to 14400. Thus, the number 7897 refers to the final TID. In this format, all channels are in one big array. The channels are addressed from the 1st channel to the last one (MaxNIC*MaxFacility*MaxChannel). In this case, the max channel number is 10*60*24=14400. The channel that represents slot 25, port 30, channel 1 is computed as follows: 5*60*24+29*24+1=7897.

EXAMPLE 2

TDM[1-14400] TDM7897

This format TDM[1-14400] is similar to the format in the first example, except that there is a prefix of "TDM" to indicate that the terminations are TDM channels. This prefix is useful in cases where there are multiple types of resources like TDM, IP and ATM that needed to be referenced at the same media gateway.

EXAMPLE 3

C[20-29]/[1-1440] C25/697

In this format, a prefix "C" represents a NIC card that is specified in a different hierarchy level. The valid range for C is from 20 to 29 inclusively. Once the slot is known, then the channel number would be an offset from the 1st channel on the slot. In this case, port 30, channel 1 has an offset of 29*24+1=697. Also, there is a prefix of "C" to the slot level. There is no prefix to the channel level.

EXAMPLE 4

C[20-29]/P[1-60]/[1-24] C25/P30/1

In this format, a prefix C is for card/slot and P for port or physical facility. This format directly describes the hierarchy level of this channel. The C25 refers to card/slot number. The P30 refers to port or physical facility number. And the 1 refers to the channel number in that facility. There is no prefix to the channel level.

EXAMPLE 5

TDM/[20-29]/[1-60]/[1-24] TDM/25/30/1

In this format, a valid TID consists of a prefix "TDM" followed by a digit in the range between 20 to 29, representing a slot number, a number in the range between 1 and 60 representing a port or physical facility, and a number in the range between 1 and 24 representing a channel number, with a forward slash "/" used to delimit the numbers. Thus, TDM/25/30/1 represents a TID of slot 25, port 30, and channel 1.

EXAMPLE 6

TDMs[20-29]clf[1-60]/[1-24] TDMs25clf30/1

In this format, a valid TID consists of a prefix "TDM" to indicate the type of resource, the letter "s" followed by a digit in the range between 20 to 29 representing a slot number, a prefix clf (for "card level facility", i.e., port) followed by a number in the range between 1 and 60 representing physical facility, and forward slash "/" followed by a number in the range between 1 and 24 representing a channel number. Thus the example TDMs25clf30/1 represents a TID of slot 25, facility 30 and channel 1. Here, prefixes "s" and "clf" are used to delimit slot and port, respectively, from channel, which is delimited with a forward slash "/".

EXAMPLE 7

TDM/[1-64]/[1-30]/[1-60]@MGW_identity
TDM/25/30/1@s1.netw.com

This format is very similar to the format of Example 5, above, except that it includes an additional piece of information: the identity of the intended MGW, which in this example is switch number 1 in the domain controlled by carrier "netw". The identity of the MGW could be a URI, as in this example, but could also be any other means to uniquely identify a MGW, such as IP address, point code/subsystem number, SIP address, and so on.

The physical termination resources are normally of hierarchy, as shown in the above examples. In the extreme case, the termination ID may have no hierarchy, just a single level. This may be done if the system has one type of physical termination resource or if the prefix, such as "TDM", "AAL2", "TDM_CAS", etc., indicates the type of the physical termination. In these scenarios, the MGW can unambiguously determine the physical resource based on the TID syntax provisioned by the flexible format expression such as "[1-14400]" or "TDM[1-14400]".

For readability, it is preferred that the TID syntax reflect the physical or logical hierarchy in a consistent order, such as from the top down. If there are more than two hierarchical levels in the termination ID, it is preferred that the first level is the highest level resource in the resource hierarchy; for a media gateway, the highest level of the hierarchy is typically a card/slot in the MGW. The slot/card level may help MGW to identify the termination type and total resources. The subsequent level can be either physical or logical. A termination ID need not have the same number of levels as the system hierarchy, and may have more or fewer levels than the system hierarchy. For example, the system may only have three physical levels, but the termination ID may have four levels. The number of hierarchical levels has no limitation as long as the total resource represented by the flexible format expression is the same as the physical resources.

In order to convey a syntax, the syntax must be unambiguously described. In one embodiment, a grammar, such as the augmented Backus-Nour Form, or ABNF, may be used to define the legal syntax of the TID expression. The full specification of ABNF is defined in IETF RFC 4234, the content of which is incorporated herein in its entirety. The following is a brief introduction to ABNF.

An ABNF specification is a set of derivation rules, written as "rule definition", where the rule is a case-sensitive nonterminal (i.e., it can be further broken down into component parts) and the definition consists of sequences of symbols that define the rule. The symbols can be nonterminals or terminals (i.e., symbols that cannot be further broken down into component parts.) A definition can include a list of alternatives delimited by a forward slash or a range of values indicated by a hyphen. Parentheses are used to indicate grouping, and repetition of an element or group is indicated by the prefix <n>*<m>, where "n" is the minimum number of times that element or group is repeated and "m" is the maximum number. If "n" is absent, the item may appear zero or more times. If "m" is absent, the item may appear an infinite number of times. For example here is a set of rules describing a decimal number:

| | |
|---|---|
| digit = | "0"/"1"/"2"/"3"/"4"/"5"/"6"/"7"/"8"/"9" |
| digit = | "0"-"9" |
| decimal = | 1*digit |
| decimal = | digit[*digit] |

The first rule indicates that a digit is one occurrence of an ascii character representing a number. The second rule is an alternative form of the same rule, making use of the range operator ("-") to indicate a range of alternatives. The third rule indicates that a decimal number is one or more digits. The fourth rule is an alternative form of the third rule, making use of square brackets ("[" and "]") to indicate an optional element. The fourth rule may be read to indicate that a decimal number consists of one digit, optionally followed by 0 or more digits.

Below is an example ABNF notation for a MEGACO format termination ID definition, with comments. As a preliminary matter it should be noted that in MEGACO syntax, an asterix (*) is a wild-card meaning "any character can go here", while the dollar sign ($) is a special wild-card character in which the recipient of the command, i.e., the gateway, can select its own value however it sees fit. For example, a command to delete all active contexts could be written in pseudo command language as "delete context *", but a command to select a voice server, any voice server, to join a context could be written in pseudo command language as "add to context A voice server $". In the former example, a command to "delete context *" means "delete any context". In the latter example, a command to "add a voice server $" to a context means "choose an available voice server and add it to the context", with in implied request to inform the MGC which VS was chosen.

TABLE 2

ABNF MEGACO TID Syntax

| Line | Syntax |
|---|---|
| 1 | TID = Level [ *SubLevel ] [ "@" PathDN ] |
| 2 | SubLevel = "/" Level |
| 3 | Level = Prefix [ Range ] |
| 4 | Prefix = *( ALPHA / DIGIT / "_" ) |
| 5 | Range = ( DIGITS) / ( "[" DIGITS "-" DIGITS "]" ) |
| 6 | PathDN = ( ALPHA / DIGIT / "*") *63( ValidChars ) |
| 7 | ValidChars = ALPHA / DIGIT / "-" / "*" / "." |
| 8 | DIGITS = 1*10( DIGIT ) |
| 9 | DIGIT = %x30-%x39 |
| 10 | ALPHA =%x41-%x5A / %x61-%x7A |

One convention in ABNF is that the compound tokens (i.e., tokens made up from other tokens or primitives) are listed at the top, followed by component pieces, and ending with primitives. As a result, to understand the possible structures that an ABNF grammar defines, it is helpful to start from the bottom of the ABNF rules and work up. For this reason, the lines of the TID syntax, written in ABNF grammar, will be explained starting from the bottom line of the example above and working up to line 1.

Line 10: ALPHA=%x41-%x5A/%x61-%x7A

The token "ALPHA" can represent any ASCII character a-zA-Z.

Line 9: DIGIT=%x30-%x39

The token "DIGIT" can represent any ASCII character 0-9.

Line 8: DIGITS=1*10(DIGIT)

The token "DIGITS" can represent a number with a length between 1 and 10 digits, inclusive.

Line 7: ValidChars=ALPHA/DIGIT/"-"/"*"/"."

The token "ValidChars" can represent a letter, a number, a hyphen ("-"), an asterix ("*"), or a period (".").

Line 6: PathDN=(ALPHA/DIGIT/"*")*63(ValidChars)

The token "PathDN" (path domain name) can represent a string from 1 to 64 characters long, where the first character must be either a letter, a number, or an asterix, and the remaining characters, if present, must be from the set defined by the token "ValidChars".

Line 5: Range=(DIGITS)/("[" DIGITS "-" DIGITS "]")

The token "Range" can represent either a single digit, or a range of digits displayed in the format "[<min>-<max>]".

Line 4: Prefix=*(ALPHA/DIGIT/"_")

The token "Prefix" can represent zero or more characters, where each character is either a letter, a number, or an underline ("_") character.

Line 3: Level=Prefix [Range]

The token "Level" will consist of a prefix, optionally followed by a range.

Line 2: SubLevel="/" Level

The token "SubLevel" will consist of a forward slash character ("/") followed by a Level token (e.g., a prefix and optional range).

Line 1: TID=Level [*SubLevel] ["@" PathDN]

The token "TID" will consist of a root Level, optionally followed by a sublevel, optionally terminated by the at-sign ("@") followed by a path domain name. That Level and SubLevels are delimited by the forward slash character.

As mentioned above, the flexible termination IDs in a hierarchical format can accommodate a group of terminations by using wildcards such as All ('*') or Choose ('$'). This is especially true for a large MGW which has more physical resources of multiple physical/logical levels. For example, for identifying a TDM channel in an OC3 facility of a MGW, the hierarchical levels may contain Slot Number, Port Number, T1/E1 Span Number and Channel Number (in the T1/E1 Span). It may contain the Path and/or DS3/VT logical levels as well. Using the Text MEGACO TID syntax described above, a channel in Slot 24, Card 2, Path 1, DS3 3, T1 5, Channel 24, can be identified as TDM/24/2/1/3/5/24. Here, "TDM" is the Level, which has a prefix "TDM" but no range; "/24", "/2", "/1", "/5", and "/24" are successive SubLevels that have no prefix but do have a range (albeit a range of one). The optional "@PathDN" was not used.

In one embodiment, PE 108 may be a network element management system (EMS), via which a network operator or user may input the flexible termination ID format expression. PE 108 may download or otherwise transfer the TID syntax into an MGW that is configured the support the flexible termination ID format and map any of the termination in the flexible expression to the corresponding physical resource correctly. For example, PE 108 may send the TID syntax in ABNF form, such as one described in Table 2, above, to MGW1 104 and/or MGW2 106. In this embodiment, the MGC specifies the termination ID format and the MGW adapts to the format. Alternatively, PE 108 may download or otherwise transfer the TID syntax into an MGC that is configured to support the flexible termination ID format. For example, PE 108 may send the TID syntax to MGC 102. In this embodiment, the termination ID format is based on the needs of the MGW and the MGC adapts to this format. In yet another alternative embodiment, the TID syntax may be transferred to MGC and one or all of the MGWs in the system. For example, PE 108 may transfer the TID syntax to MGC 102, MGW1 104, and MGW2 106. This may be useful for large systems, for example, where the network operator desires to standardize the TID format used by all MGCs in the network and their associated MGWs.

Figure 2:
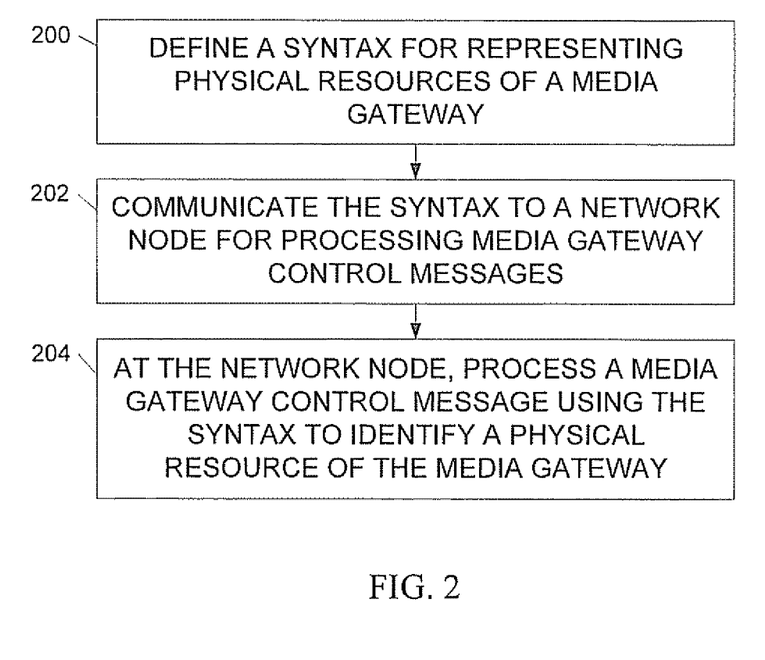
FIG. 2 is a flow chart illustrating an exemplary process for flexibly identifying physical resources within a media gateway in accordance with an embodiment of the subject matter described herein.

FIG. 2 is a flow chart illustrating an exemplary process for flexibly identifying physical resources within a media gateway in accordance with an embodiment of the subject matter described herein. At block 200, a syntax for representing the physical resources of a media gateway is defined. For example, a network operator may use a grammar, such as ABNF, to define a syntax that describes valid termination IDs within one or more media gateways. The network may include an element management system, such as PE 108, for maintaining the TID syntax. PE 108 may provide a graphic interface, web interface, programming interface, or other means by which an operator or use may define the TID syntax.

At block 202, the syntax is communicated to a network node for processing media gateway control messages, and at block 204, the network node processes a media gateway control message using the syntax to identify a physical resource of the media gateway. For example, PE 108 may communicate the TID syntax to MGC 102. MGC 102 may use the syntax to construct gateway control protocol (GCP) messages in a format that MGW1 104 and/or MGW2 106 can process and also interpret GCP messages received from these media gateway. PE 108 may communicate the TID syntax to either or both of MGW1 104 and MGW2 106, which may use the syntax to interpret GCP messages received from MGC 102 and also construct messages to MGC 102 in a format that MGC 102 can process. Thus, the TID syntax is used to process GCP messages, which may include using the syntax to construct a message to be sent and using the syntax to interpret a message received.

Next, an example in which a new MGC is being integrated into a set of existing MGWs will be presented to illustrate high-level steps for accomplishing automatic configuration of TID format, followed by an example call setup showing example messages communicated between a media gateway controller and the media gateways under its control, used to create the call from caller 120 to callee 122 as shown in FIG. 1.

Figure 3:
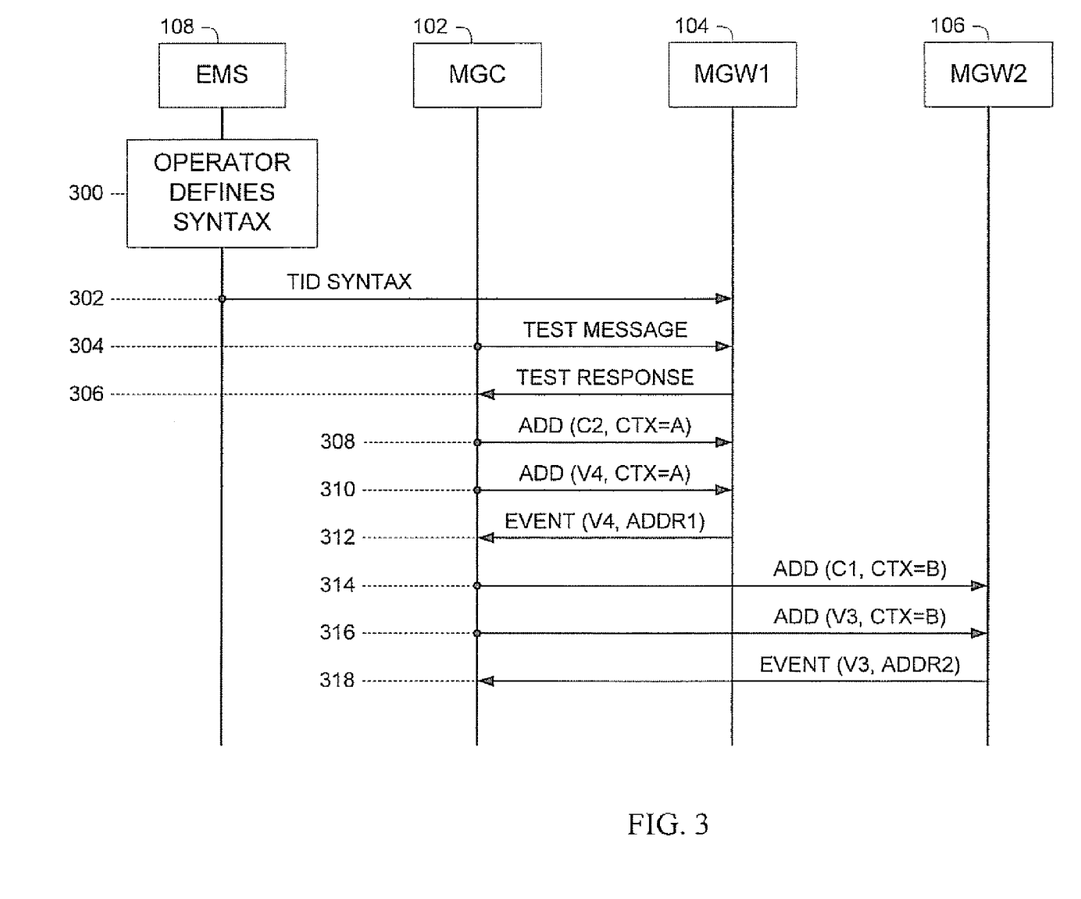
FIG. 3 is a message flow diagram illustrating messages communicated in a system in accordance with an embodiment of the subject matter described herein.

FIG. 3 is a message flow diagram illustrating messages communicated in a system in accordance with an embodiment of the subject matter described herein. In one embodiment, the messages are communicated between PE 108, shown in FIG. 3 as an element management system (EMS), MGC 102, MGW1 104, and MGW2 106.

At block 300, a network operator at PE 108 defines a TID syntax. In alternative embodiments, the syntax may be defined using a grammar such as ABNF, defined graphically via a graphical user interface (GUI), described in a table or tree format, or defined by some other means known in the art. In one embodiment, PE 108 may provide a web-based interface for defining and managing one or more TID syntaxes. The TID syntax may be processed in preparation for transfer to the destination node. For example, the TID syntax may be converted from text into binary format, compiled, assembled, translated, converted to table or database format, compressed to reduce transmission size, and so on.

In message 302, the TID syntax is transferred to a network node for processing gateway control protocol messages. In the embodiment illustrated in FIG. 3, the TID syntax is transferred from PE 108 to MGW1 104. In alternative embodiments, the TID syntax may be loaded into other MGWs, such as MGW2 106, or loaded into MGC 102 in addition to or instead of being loaded into the MGW1 104.

In one embodiment, the node receiving the TID syntax may process the received TID syntax in preparation for use. For example, if the syntax was compressed or encrypted in preparation for transmission from PE 108 to MGW1 104, MGW1 104 may uncompress or decrypt the received data. Similarly, MGW1 104 may convert the received TID syntax from one format into another. In one embodiment, the syntax TID may be in a human readable form, such as source code, which MGW1 104 may convert into a binary form, via compilation, translation, and so forth.

In one embodiment, the node receiving the TID syntax may send a test message to verify the proper installation of the TID syntax or to verify the correctness of the TID syntax itself. For example, MGW1 104 may issue a test message 304 to MGC 102 using the newly-installed TID syntax. If MGC 102 sends a test response 306, which MGW1 104 can process and contains the expected response, MGW1 104 may consider the new TID syntax ready for use. Otherwise, if MGC 102 does not respond, or if MGC 102 responds with a message indicating some error in message 304, MGW1 104 may reject the newly-installed TID syntax and optionally revert to the previously successfully installed syntax or some other default.

The remainder of this example, which assumes that the TID syntax was successfully installed and verified, describes the messages exchanged between MGC 102, MGW1 104 and MGW2 106 in response to an attempt by caller 120 to contact callee 122. MGC 102 determines that caller 120 is attempting to place a call to callee 122, such as by receiving a signaling message to that effect from a switching point (not shown) in the TDM network in which caller 120 is located. In response, MGC 102 may attempt to create two half calls, one in MGW1 104 and the other in MGW2 106, in order to route the call through packet network 112. Thus, MGC 102 may create two contexts, named "A" and "B", representing the half-calls through MGW1 104 and MGW2 106, respectively. MGC 102 may then instruct the media gateways to reserve the physical resources necessary to create the half-calls through each gateway.

Message 308 is a GCP command sent from MGC 102 to MGW1 104 requesting the addition of a TDM channel to the context named "A". The TDM channel is identified by its termination ID, "C2". Upon receiving a GCP command, MGW1 104 may parse the command to verify that the TID is valid according to the newly installed TID syntax. If so, the new TID syntax is used, but if not, MGW1 104 may use a fallback or default syntax, or it may simply issue an error message back to MGC 102.

Message 310 is another GCP command sent from MGC 102 to MGW1 104, requesting the addition of a voice server to the context "A". The voice server is identified by its termination ID, "V4". Message 312 is a GCP response sent from MGW1 104 to MGC 102, confirming the addition of voice server "V4" to the context, and providing to MGC 102 the network address of the network interface associated with voice server V4, "ADDR1". Messages 308, 310, and 312 collectively establish a call leg from caller 120 through MGW1 104 to packet network 112.

Message 314 is a GCP command sent from MGC 102 to MGW2 106 requesting the addition of TDM channel identified by TID "C2" to context "B". Message 316 is another GCP command sent from MGC 102 to MGW2 106, requesting the addition of voice server identified by TID "V3" to the context "B". Message 318 is a GCP response sent from MGW2 106 to MGC 102, confirming the addition of voice server "V3" to the context, and providing to MGC 102 the network address of the network interface associated with voice server V3, which in this example is "ADDR2". Messages 314, 316, and 318 collectively establish a call leg from packet network 112 to callee 122.

It will be understood that various details of the subject matter described herein may be changed without departing from the scope of the subject matter described herein. For example, while the illustrations above use text forms of GCP messages, the methods and system disclosed herein equally apply to protocols and/or termination ID in binary format. Similarly, although Text MEGACO GCP commands were used for illustration, other GCP command protocols are within the scope of the subject matter claimed. Also, physical terminations are not limited to TDM type, and the subject matter disclosed herein may apply to other network technologies, such as IP, asynchronous transfer mode (ATM) networks and their ATM adaptation layers (AAL1, AAL2, etc.) Furthermore, the foregoing description is for the purpose of illustration only, and not for the purpose of limitation.

What is claimed is:

1. A method for flexibly identifying terminations within a media gateway, the method comprising:
   at a network node for processing gateway control protocol (GCP) messages:
   receiving a termination identifier (TID) definition that describes a new TID syntax used by the network node to identify terminations of the media gateway while interpreting incoming messages or generating outgoing messages, wherein the TID definition includes a flexible expression for identifying terminations of the media gateway in any one of a plurality of different formats, wherein the flexible expression includes a flexible hierarchical structure having a root level and a plurality of different delimited sublevels, and wherein the plurality of different sublevels includes at least a prefix for identifying a type of resource, a numerical range, and a path domain name;
   installing the new TID syntax;
   verifying whether the new TID syntax is successfully installed via generating and parsing of at least one test message; and
   in response to successful parsing of the at least one test message using the new TID syntax, processing incoming or outgoing GCP messages using the new TID syntax to identify a termination of the media gateway; and
   in response to unsuccessful parsing of the at least one test message using the new TID syntax, processing incoming or outgoing GCP messages using a default TID syntax to identify the termination of the media gateway;
   wherein the network node comprises a media gateway controller; and
   wherein the media gateway and the media gateway controller use different native formats to identify terminations and wherein receiving a new TID syntax includes receiving a syntax having a format native to the media gateway.

2. The method of claim 1 wherein the new TID syntax includes a representation of a TID for representing a physical resource on the media gateway that sources and sinks media and control streams.

3. The method of claim 1 wherein the network node comprises the media gateway.

4. The method of claim 3 wherein the media gateway communicates media gateway control messages to and from a media gateway controller, wherein the media gateway and the media gateway controller use different native formats to identify terminations, and wherein receiving a new TID syntax includes receiving a syntax having a format native to the media gateway controller.

5. The method of claim 1 wherein the network node uses the new TID syntax to at least one of:
   create media gateway control messages in a format used by a second network node and send the created messages to the second network node; and
   parse media gateway control messages received from a second network node, the messages being in a format used by the second network node.

6. The method of claim 1 wherein receiving a TID definition includes receiving a TID definition defined by a user via a provisioning system.

7. The method of claim 1 wherein receiving a TID definition includes receiving a TID definition for representing time division multiplexed (TDM) and packet terminations within the media gateway.

8. The method of claim 1 wherein the new TID syntax includes a plurality of ranges of valid numeric time division multiplexed (TDM) termination identifiers.

9. The method of claim 1 wherein the new TID syntax includes a universal resource identifier (URI) for identifying a media gateway.

10. A system for flexibly identifying terminations within a media gateway, the system comprising:
    a media gateway for providing terminations related to a bearer path of a call; and
    a media gateway controller for determining, controlling, and configuring the terminations within the media gateway via media gateway control messages communicated between the media gateway controller and the media gateway;
    wherein at least one of the media gateway and the media gateway controller is configured to receive a termination identifier (TID) definition that describes a new TID syntax that is used by the network node to identify terminations of the media gateway while interpreting incoming messages or generating outgoing messages, install the new TID syntax, verify the new TID syntax via generation of at least one test message, and process incoming and outgoing media gateway control messages using the new TID syntax upon verification of successful installation of the new TID syntax and a default TID syntax upon unsuccessful installation of the new TID syntax; and
    wherein the TID definition includes a flexible expression for identifying terminations of the media gateway in any one of a plurality of different formats, wherein the flexible expression includes a flexible hierarchical structure having a root level and a plurality of different delimited sublevels, and wherein the plurality of different sublevels includes at least a prefix for identifying a type of resource, a numerical range, and a path domain name;
    wherein the media gateway and the media gateway controller use different native formats to identify terminations and wherein the media gateway controller is configured to receive the new TID syntax having a format native to the media gateway.

11. The system of claim 10 comprising a provisioning service for communicating the TID definition to at least one of the media gateway and the media gateway controller.

12. The system of claim 11 wherein the provisioning service comprises a web-based interface for receiving the TID definition from a user and for transmitting the TID definition to at least one of the media gateway and the media gateway controller.

13. The system of claim 10 wherein the terminations include at least one of a time division multiplexed (TDM) interface and a voice server.

14. The system of claim 10 wherein media gateway controller uses the new TID syntax to at least one of:
  create media gateway control messages in a format used by the media gateway and send the created messages to the media gateway; and
  parse media gateway control messages received from the media gateway, the messages being in a format used by the media gateway.

15. The system of claim 10 wherein the media gateway and the media gateway controller use different native formats to identify terminations and wherein the media gateway is configured to receive the new TID syntax having a format native to the media gateway controller.

16. The system of claim 15 wherein media gateway uses the new TID syntax to at least one of:
  create media gateway control messages in a format used by the media gateway controller and send the created messages to the media gateway controller; and
  parse media gateway control messages received from the media gateway controller, the messages being in a format used by the media gateway controller.

17. The system of claim 10 wherein the new TID syntax includes a plurality of ranges of valid numeric time division multiplexed (TDM) termination identifiers.

18. The system of claim 10 wherein the new TID syntax includes a universal resource identifier (URI) for identifying a media gateway.

19. A computer program product comprising computer executable instructions embodied in a non-transitory computer readable medium for performing steps comprising:
  at a network node for processing gateway control protocol (GCP) messages:
    receiving a termination identifier (TID) definition that describes a new TID syntax used by the network node to identify terminations of the media gateway while interpreting incoming messages or generating outgoing messages, wherein the TID definition includes a flexible expression for identifying terminations of the media gateway in any one of a plurality of different formats, wherein the flexible expression includes a flexible hierarchical structure having a root level and a plurality of different delimited sublevels, and wherein the plurality of different sublevels includes at least a prefix for identifying a type of resource, a numerical range, and a path domain name;
  installing the new TID syntax;
  verifying whether the new TID syntax is successfully installed via generating and parsing of at least one test message; and
  in response to successful parsing of the at least one test message using the new TID syntax, processing incoming or outgoing GCP messages using the new TID syntax to identify a termination of the media gateway; and
  in response to unsuccessful parsing of the at least one test message using the new TID syntax, processing incoming or outgoing GCP messages using a default TID syntax to identify the termination of the media gateway;
  wherein the network node comprises a media gateway controller; and
  wherein the media gateway and the media gateway controller use different native formats to identify terminations and wherein the media gateway controller is configured to receive the new TID syntax having a format native to the media gateway.

20. The computer program product of claim 19 wherein the new TID syntax includes a representation of a TID for representing a physical resource on the media gateway that sources and sinks media and control streams.

21. The computer program product of claim 19 wherein the network node comprises at least one of a media gateway controller and a media gateway.

22. The computer program product of claim 19 wherein the network node uses the new TID syntax to at least one of:
  create media gateway control messages in a format used by a second network node and send the created messages to the second network node; and
  parse media gateway control messages received from a second network node, the messages being in a format used by the second network node.

* * * * *